（12) United States Patent
Stone

(10) Patent No.: US 9,896,335 B1
(45) Date of Patent: Feb. 20, 2018

(54) MULTIPLE OXYGEN ALLOTROPE GENERATOR

(71) Applicant: Robert de la Torre Stone, Del Mar, CA (US)

(72) Inventor: Robert de la Torre Stone, Del Mar, CA (US)

( * ) Notice: Subject to any disclaimer, the term of this patent is extended or adjusted under 35 U.S.C. 154(b) by 0 days.

(21) Appl. No.: 15/405,838

(22) Filed: Jan. 13, 2017

Related U.S. Application Data

(63) Continuation of application No. PCT/US2016/046303, filed on Aug. 10, 2016.

(51) Int. Cl.
*B01J 19/08* (2006.01)
*C01B 13/11* (2006.01)
*C01B 13/00* (2006.01)

(52) U.S. Cl.
CPC .............. *C01B 13/11* (2013.01); *C01B 13/00* (2013.01); *C01B 2201/12* (2013.01); *C01B 2201/40* (2013.01)

(58) Field of Classification Search
CPC ..... C01B 13/11; C01B 13/00; C01B 2201/12; C01B 2201/40; C01B 2201/10; C01B 2201/14; C01B 2201/20; C01B 2201/30; C01B 2201/62; C01B 2201/64; C01B 2201/22; A61L 2/202; A61L 9/015; B01D 53/32; B01J 19/088; B01J 2219/0809; B01J 2219/083; B01J 2219/0875; B01J 2219/0841; H01T 23/00; C02F 2201/782; C25B 9/08; C25B 1/13
See application file for complete search history.

(56) References Cited

U.S. PATENT DOCUMENTS

| | | | |
|---|---|---|---|
| 2,405,728 | A | 8/1946 | Allison |
| 4,877,588 | A | 10/1989 | Ditzler et al. |
| 4,960,570 | A | 10/1990 | Mechtersheimer |
| 5,409,673 | A | 4/1995 | Mausgrover et al. |
| 5,525,310 | A | 6/1996 | Decker et al. |
| 5,945,073 | A | 8/1999 | Ditzler et al. |

(Continued)

FOREIGN PATENT DOCUMENTS

EP    1777323 A2    4/2007

OTHER PUBLICATIONS

Gadzhiev, Oleg B. et al., Structure, Energy, and Vibrational Frequencies of Oxygen Allotropes on (n≤6) in the Covalently Bound and van der Waals Forms: Ab Initio Study at the CCSD(T) Level; Journal of Chemical Theory and Computation; American Chemical Society; Nov. 16, 2012; pp. 247-262.

(Continued)

*Primary Examiner* — Xiuyu Tai
(74) *Attorney, Agent, or Firm* — The Maxham Firm

(57) ABSTRACT

An oxygen allotrope generator having a tube with an electrically grounded outer surface and an electrically positive inner surface. A plurality of corona reaction plates are spaced along the interior of the tube, the plates being longitudinally inter-connected by wires and being in electrical connection with the electrically positive inner surface of the tube. An outer jacket encloses the tube and provides a second linear pass for partially ozonated gas to flow in the generator. An alternative embodiment includes external distributed ground connections at the locations of the corona reaction.

20 Claims, 7 Drawing Sheets

(56) References Cited

U.S. PATENT DOCUMENTS

| | | | |
|---|---|---|---|
| 6,511,638 B2 | 1/2003 | Matsuzaki | |
| 6,544,486 B2 * | 4/2003 | Golota | C01B 13/11 422/186.18 |
| 7,314,600 B2 | 1/2008 | Matsuzaki | |
| 2002/0170817 A1 | 11/2002 | Goudy, Jr. | |
| 2004/0197244 A1 | 10/2004 | Kirby | |
| 2007/0166209 A1 * | 7/2007 | Zimmerman | A61L 2/202 422/186.07 |
| 2008/0047907 A1 | 2/2008 | Herzog | |
| 2015/0247246 A1 * | 9/2015 | Katayama | C25B 9/08 204/260 |

OTHER PUBLICATIONS

Oda, Tatsuki et al.; Noncollinear Magnetism in Liquid Oxygen: A First-principles Molecular Dynamics Study; The American Physical Society; Oct. 5, 2004; pp. 1-19.
Cacace, Fulvio et al.; Experimental Detection of Tetraoxygen; Angew, Chem. Int. Ed. vol. 40, No. 21; 2001; pp. 4062-4065.
Shimizu, K. et al.; Superconductivity in Oxygen; Nature, Macmillan Publishers Ltd., vol. 393; Jun. 1998; pp. 767-769.
Freiman, Yu. A.; Solid Oxygen; Elseivier; Physics Reports 401; Jun. 16, 2004; pp. 1-228.
Lundegaard, Lars F. et al.; Observation of an O8 Molecular Lattice in the ϵ Phase of Solid Oxygen; Nature Publishing Group; vol. 443; Sep. 14, 2006; pp. 201-204.
International Search Report and Written Opinion of the ISA of corresponding PCT application (PCT/US2016/046303), dated Nov. 24, 2016; 7 pages.

* cited by examiner

MULTIPLE OXYGEN ALLOTROPE GENERATOR

FIELD OF INVENTION

The present invention generally relates to apparatus and methods for generating ozone and/or other oxygen allotropes.

DISCUSSION OF THE PRIOR ART

Oxygen occurs in several allotropic forms. Oxygen is a stable molecule when it occurs in diametric form as $O_2$ and is one of the most plentiful elements on earth. Ozone ($O_3$) occurs naturally in the atmosphere during lightning strikes and other electric discharge phenomena as well as by the action of ultraviolet light. In addition, some combinations of oxygen allotropes can be formed, such as $O_3 \ldots O_n$ or ozone dimers (($O_3)_2$) (see Gadzhiev et al. (2013) J. Chem. Theory Comput. 9:247-262). Yet other allotropes of oxygen are known to be produced under particular temperature and pressure conditions. For example, another allotrope of oxygen, tetraoxygen ($O_4$), also called oxozone, is thought to be short-lived, and is believed to be a far more potent oxidizing agent than ozone (see Oda and Pasquarello (2004) Physical Review B, 70(13) id 134402 and Cacace et al. (2001) Angew. Chem. Int. Ed. 40:4062-4065). Some other allotropes such as $O_5$, $O_6$, $O_7$, and/or the various phases of solid oxygen also exist—α-phase (light blue in color), β-phase (faint blue to pink), γ-phase (faint blue), δ-phase (orange), ε-phase (dark-red to black; $O_8$) and ζ-phase (metallic; $O_9$) (see, for example, Shimizu et al. (1998) Nature 393 (6687): 767-769; Freiman and Jodl (2004) Physics Reports 401:1-228; and Luyndegaard et al. (2006) Nature 443: 201-204).

Ozone is the best understood oxygen allotrope aside from $O_2$. It is a violet/bluish colored gas with a pungent/chlorine-like odor. The ozone allotrope, when mixed in water, is generally colorless or the color becomes undetectable, and the gas is sparingly soluble in water. Ozone is produced when an electrical charge molecularly disassociates a stable diametric molecule ($O_2$), splitting it apart and forming two unstable atoms of oxygen. Seeking stability, these atoms attach to other oxygen molecules to create ozone ($O_3$).

There are three main approaches typically used to produce ozone: corona discharge, ultraviolet treatment, and cold plasma generation. In corona discharge generation of ozone, dry air or an oxygen-containing gas is passed through a high energy electrical field. Generally, a corona discharge ozone generating device has multiple electrostatic plates separated by dielectric plates. This type of organization can be found in many patents and parent publications. For example, interleaved dielectric and electrostatic plates have been described at least as early as 1946 (see U.S. Pat. No. 2,405,728). U.S. Pat. Pub. No. 2004/0197244 purports to provide a corona discharge with improved ozone generation output and efficiency and reduced heat generation by generating a corona discharge from interleaved longitudinal stacks of flat perforated metal electrode plates separated by ceramic dielectric plates. U.S. Pat. No. 5,525,310 (Decker et al.) also discloses a corona discharge ozone generating device having a plurality of stainless steel wire mesh grid electrodes interposed with ceramic dielectric plates. In some instances, a catalyst, such as a lead dioxide catalyst, is deposited on the surface of a metal plate to increase ozone production (see EP 1 777 323, for example).

In the past, heat generation from corona discharge has been a problem. This has been addressed by incorporating some type of cooling apparatus, such as the cooling jacket of U.S. Pat. No. 2,405,728, or by using metal rods or dielectric rods in the discharge spaces between inner and outer electrodes or between outer electrodes and dielectric tubes, as in U.S. Pat. No. 4,960,570. In some instances, high voltage has been used in an attempt to enhance ozone production (U.S. Pat. No. 5,409,673 and U.S. Pat. Pub. No. 2008/0047907).

Ultraviolet treatment of air can split di-oxygen molecules ($O_2$) into oxygen atoms, which then attach to other di-oxygen molecules to form ozone. However, this method of ozone production is inefficient and almost every industrial ozone producer relies upon the corona discharge method.

Cold plasma ozone generators use pure oxygen gas exposed to a plasma created by dielectric barrier discharge. This acts to split di-oxygen into single atoms, which then recombine to form ozone. While more efficient than ultraviolet treatment, cold plasma machines produce a maximum concentration of about 5% ozone and are consequently primarily used in clinical situations.

Ozone decomposes spontaneously in water, producing hydrogen peroxy ($HO_2$) and hydroxyl (OH) free radicals, which have great oxidizing capacity and serve as a powerful disinfectant that readily oxidizes organic pollutants, inorganic pollutants, and microorganisms, such as Giardia and Cryptosporidium. The other reactive allotropes of oxygen are also believed to behave similarly, although they have a more powerful effect on pollutants and microorganisms.

Little is known and understood about other oxygen allotropes, such as $O_4$, $O_5$, $O_6$, $O_7$, $O_8$, etc., and generating these allotropic forms has been difficult, inefficient, and fraught with controversy due, in part, to their transitory nature and lack of abundant samples for study. There does not appear to be presently available an efficient oxygen allotrope generator which is self-contained, does not require elaborate dielectric materials, does not generate excess heat, uses little electricity, and has a low operating cost.

SUMMARY OF EMBODIMENTS OF THE INVENTION

A purpose of the present apparatus is to provide an efficient oxygen allotrope generator which is self-contained, does not require elaborate dielectric materials, does not generate excess heat, uses minimal power (electricity), and has relatively low operating cost.

BRIEF DESCRIPTION OF THE DRAWING

The objects, advantages, and features of the invention embodiments disclosed herein will be readily perceived from the following detailed description, when read in conjunction with the accompanying drawing, in which.

DETAILED DESCRIPTION OF EMBODIMENTS OF THE INVENTION

Figure 1:
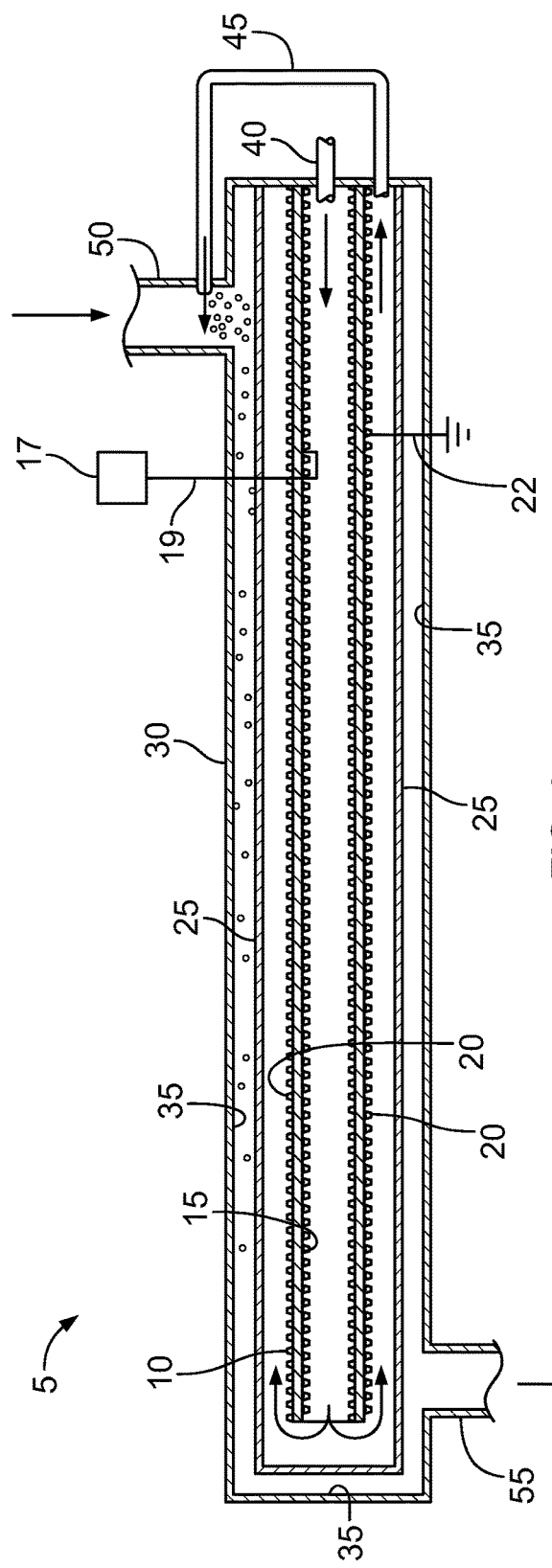
FIG. 1 is a cross-section of ozone generator in accordance with the prior art.

The apparatus disclosed herein is an improvement over the oxygen allotrope generator shown in FIG. 1, which is shown in U.S. Pat. No. 7,314,600. For context, this prior art will be described in some detail. While the oxygen allotrope generators are generally depicted herein in a horizontal orientation, that is for presentation convenience. The generator embodiment described would normally be employed in a vertical orientation, with the gas entrance and exit at the bottom end, as will be discussed below.

FIG. 1 shows prior art apparatus 5 for generating oxygen allotropes, one being ozone. Interior element or tube 10 is located within jacket 25. The tube is generally hollow. Positioned around the interior of tube 10 is inner mesh 15 and positioned around the outer surface of the tube is outer mesh 20. An exemplary mesh is a number 10 mesh made of stainless steel wires. Titanium can also be employed. As noted in U.S. Pat. No. 7,314,600, elements 15 and 20 need only be an appropriate form of electrically conductive wires and need not be in the form of a mesh, but that term will be used herein for convenience.

An electrical energy source 17 supplies energy through connector 19 to inner mesh 15. Outer mesh 20 is connected to electrical ground 22. In operation, the electrical energy source provides a DC voltage to inner mesh 15. When the amount of voltage applied to inner mesh 15 is sufficient, an arc is formed that passes through tube 10 to outer mesh 20.

As an example, tube 10 is cylindrical having an outer diameter of about 1.5 inches and may be manufactured from fused quartz or synthetic fused silica. This structure creates ultraviolet radiation in an ozone allotrope-generating wavelength of about 185 nanometers (nm). p Surrounding tube 10, and inner and outer meshes 15 and 20, is jacket 25. The jacket is substantially transparent and constructed of the same quartz or silica used to construct tube 10 so that the jacket has the same thermal, optical, and other physical qualities as tube 10. Jacket 25 confines the flow of oxygen-containing gas over outer mesh 20.

Inlet 40 is located at an end of tube 10 and oxygen-containing gas is directed through the inlet and along the interior of the tube. The incoming oxygen-containing gas is exposed to inner mesh 15 that is generating a multiplicity of electric arcs, which radiate UV radiation. The oxygen in the oxygen-containing gas is converted to ozone upon exposure to the UV radiation as the gas progresses along the length of tube 10. Upon reaching the end of tube 10, the oxygen-containing gas contacts the inner surface of jacket 25 and is redirected along the outer surface of tube 10, contacting outer mesh 20 and again being exposed to the ultraviolet radiation generated by the electric arcs present in outer mesh 20. This second exposure to the ultraviolet radiation generates more oxygen allotropes, significantly increasing the amount of oxygen allotropes that are generated and increasing the efficiency of the oxygen allotrope generator. For simplicity, the term "ozone" is employed herein and is intended to include ozone and other allotropes of oxygen where appropriate.

After the oxygen-containing gas is exposed to both inner mesh 15 and outer mesh 20, it passes through ozone return line 45 positioned at one end of jacket 25.

Housing 30 encompasses both tube 10 and jacket 25 and contains and directs contaminated fluid around the jacket. Housing 30 includes fluid inlet 50 and fluid exit 55. Ozone return line 45 connects into fluid inlet 50. The ozone return line delivers ozone from jacket 25 to fluid inlet 50, injecting ozone into the fluid. Because jacket 25 is substantially transparent to ultraviolet radiation generated by the electric arcs formed between inner mesh 15 and outer mesh 20, additional ozone is formed in the fluid from oxygen present in the fluid. This structure simultaneously injects ozone gas into a fluid and exposes the fluid to ultraviolet radiation which creates additional ozone in the fluid.

As shown, reflective surface 35 on the interior surface of the housing 30, which may be made of stainless steel, reflects the ultraviolet radiation generated by inner mesh 15 and outer mesh 20, thereby exposing the fluid to additional ultraviolet radiation.

Figure 2:
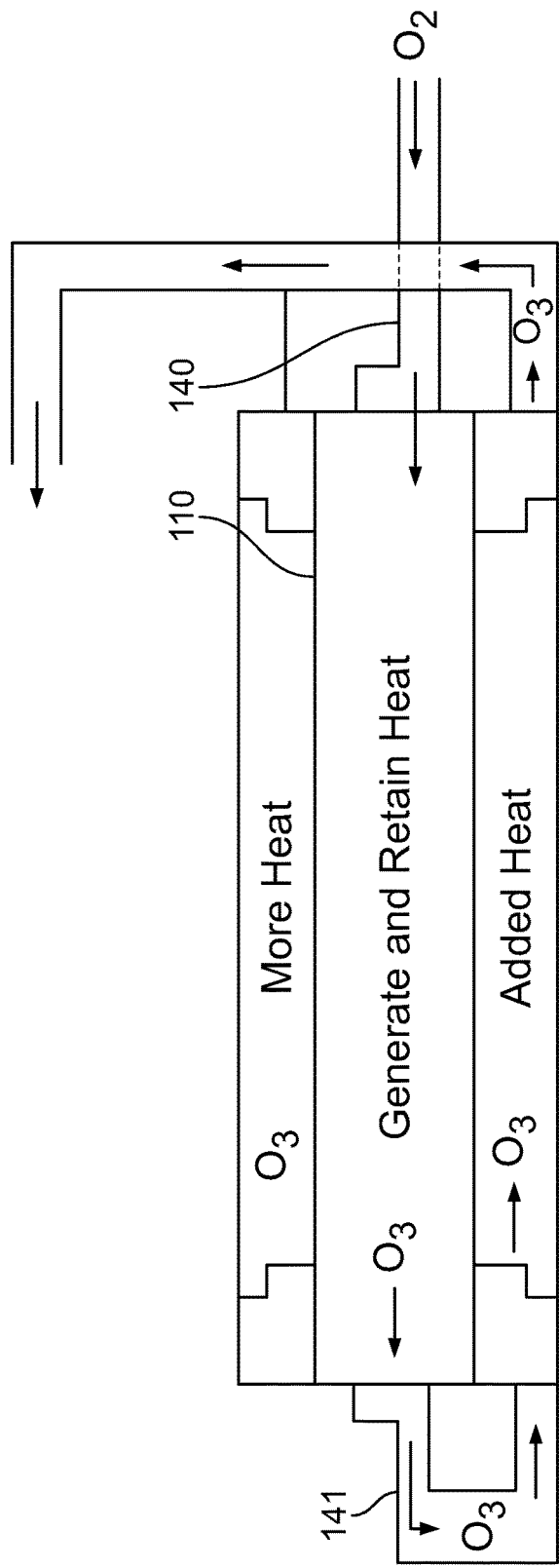
FIG. 2 is a schematic representative of a prior art ozone generator.

A typical prior art ozone generator is shown schematically in FIG. 2. Oxygen enters through tube 140 into main ozone generating tube 110 where heat is generated by the process and, because both ends of tube 110 are closed, except for entrance and exit tubes or port (141), heat is retained within the center tube. In order for the (in) oxygen gas to exit the interior (center) of the prior art chamber, the now converted oxygen to ozone gas had to exit out of its top supporting end/sleeve via "one" center hole. Then via a Teflon hose be re-entered back into the generator into "one side" of the exterior of the generator and then out to the fluid being treated.

A cold start is when all the parts of the generator, including the oxygen gas, are still cold. When the generator is on after about a 15 minute warm up time, for example, the generator parts would start accumulating/retaining heat, and this accumulation of heat within the center of the generator would start having a reduction effect in the generator's ozone production. The re-entered ozone gas into the outside chambers of the generator is now hot and more heat is added to the already heated outside chamber. This prior art system also only had "one" exit point. Although earlier prior art generators did generate a useful amount of ozone, several air chillers had to be used to inject cooled oxygen into the generator to keep it cool.

Almost all ozone generators have big heat retention challenges/issues, and so some ozone generators require water jackets or heavy fans to keep the generator cool enough to produce ozone gas after the generator has warmed/heated up.

The present apparatus addresses the unwanted heat generation as will be explained below.

Figure 3:
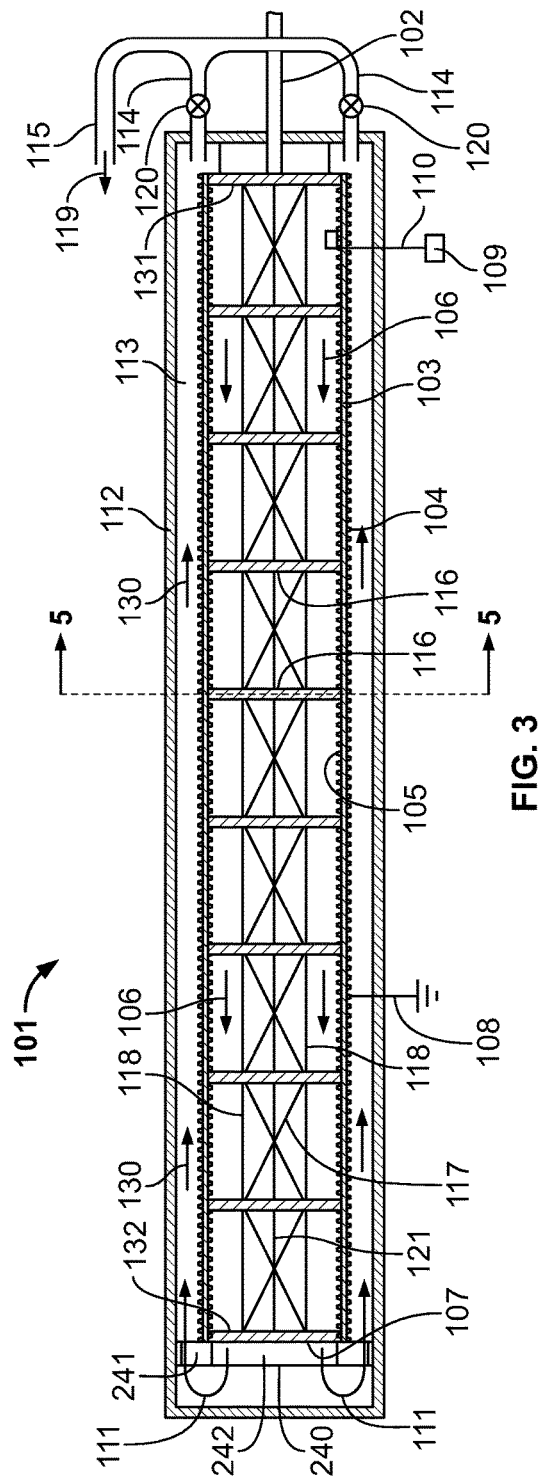
FIG. 3 is a cross-section of an oxygen allotrope ozone generator, somewhat schematically, in accordance with an embodiment of the present invention.

FIG. 3 shows the central portion of an embodiment of the present ozone generator 101 having inlet pipe 102 at one end of crystal tube 103. Inlet 102 may be a tube of suitable material, such as PTFE (polytetrafluoroethylene, sold under the trademark Teflon), preferably with an inside diameter of 0.375 inch (9.53 mm). The incoming gas is preferably at least 90-95% dry $O_2$ which can be supplied from a tank, or external source, or an oxygen generator. A suitable oxygen generator is available, for example, from AirSep Industrial in Buffalo, N.Y., with their Advanced Technology Fractionators (ATF) series systems.

Grounded (108) electronically conductive wire lining or element 104 is applied around tube 103 and electrically positive element or lining of wires 105 (power source 109 connected by wire 110) is on the inside surface of the tube.

Linings 104 and 105 are preferably in the form of a mesh, and that term will generally be used herein, although those linings can take any form. Arrows 106 indicate the direction of oxygen-containing gas flowing through tube 103, exiting around open end 107 of the tube as shown by flow arrows 111. Tube 103 is surrounded by exterior, preferably metallic or reflectively polished, jacket 112, forming flow space or chamber 113 between jacket 112 and tube 103. The fluid flows back toward the entrance end of the tube and exits ozone generator 101 through tubes 114 and out through pipe 115 for use as a disinfectant, for example. Outflow fluid 119 has an ozone concentration as generated by ozone generator 101. Tests show that when a typical ozone meter is employed at the exit end of pipe 115 it maxes out, showing that output 119 of the ozone generator is at least 400 instant grams of ozone per Normal cubic meter ($O_3$ $gNm^3$), based on a 90-95% oxygen input.

Within tube 103 are corona reaction plates 116, of which there are several (ten are shown). These plates will be discussed in greater detail below, and will also be referred to as mesh plates.

Connecting plates 116 together and supporting them in place within the tube are positive spiraled support wires 117, corona reaction positive straight wires 118, and longitudinal central positive straight support wire 121. The corona reaction plates 116 are at about 3.0 inch (7.6 cm) spacing throughout the length of tube 103 as shown, and two of them, corona reaction plates 131 and 132, are fixed on the respective ends of the tube. Central support wire 121, spiraled support wires 117, and straight support wires 118 are secured to end plates 131 and 132 and to each plate 116 along the length of the tube. Each corner 123 (FIG. 5) of each mesh plate 116, 131, 132, is in physical and electrical contact with inner wire mesh 105. Thus, all electrically conductive elements inside tube 103 are electrically positive.

Figure 4:
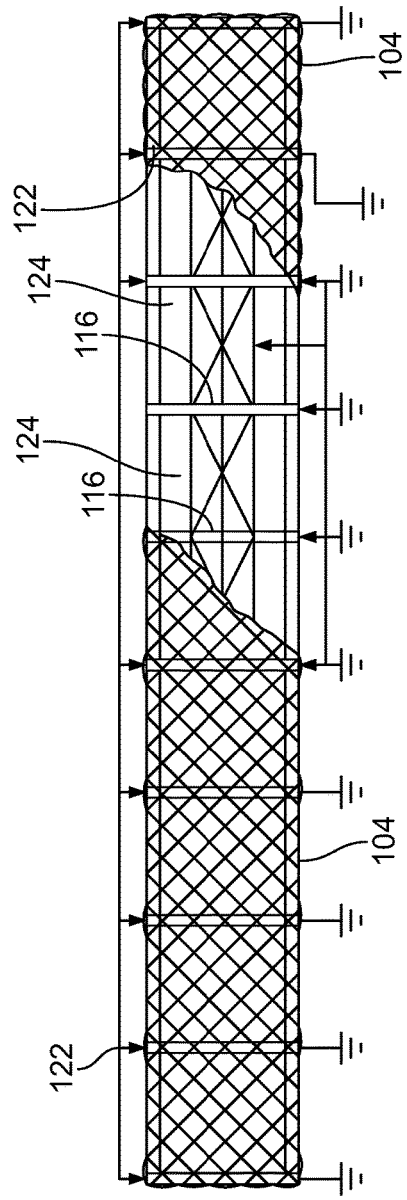
FIG. 4 is an alternative embodiment showing a partial cut-away view of the central tube portion of FIG. 3 with distributed grounding wires connected to the outer mesh.

An alternative embodiment is shown in FIG. 4. Negative or grounded outside wire mesh 104 is represented in the FIG. 4 side view. In contrast with the single ground 108 in FIG. 3, each position of a mesh plate 116, 131, 132 includes grounding wire 122, preferably formed as multiple turns of wire, wrapped around tube 103 and over mesh 104. It has been found that by adding grounding wires 122 in physical and electrical contact with outer mesh 104 at the locations of positive corona reaction plates 116, 131, 132 within tube 103, the effective charge difference between the inside and the outside of the tube produces more static reaction inside the tube, increases the effectiveness, both inside and outside the tube, of the arcing, in creating ozone and allotropes of oxygen, and increases the UV wavelength energy by producing a brighter UV arcing effect. This distributed grounding embodiment (FIG. 4) has been found to increase ozone throughput by as much as 60 to 100% compared with the FIG. 3 embodiment. At the same time that UV wavelength energy is being produced, it is also enhanced by the charge differences just described. Further, the static electricity encountered by the oxygen containing gas passing down the length of tube 103 through corona reaction plates 116, 131, 132 also increases the production of ozone.

There is a spacing of about 0.25 inch (6.35 mm) between outer mesh 104 and the inner surface of exterior jacket 112. Therefore, every extra wire buildup due to the grounding wires (FIG. 4) over the outer mesh creates a small mound or bump (bottle neck effect) that the oxygen has to pass over as it travels down chamber 113 of the generator. This bottle neck effect forces the oxygen to backup, buildup, and expand, prolonging the exposure of the gas to the UV light. The more the oxygen is exposed to the UV light the more are the chances that the oxygen has a magnetizing effect with other oxygen molecules wanting to bond with other electrons. Tests show that there is a substantial increase in ozone production when these extra, or grounding, wires are added to the generator due to the two effects stated above: the multiple or distributed grounding, and the extra exposure of the flowing oxygen to UV radiation.

Figure 5:
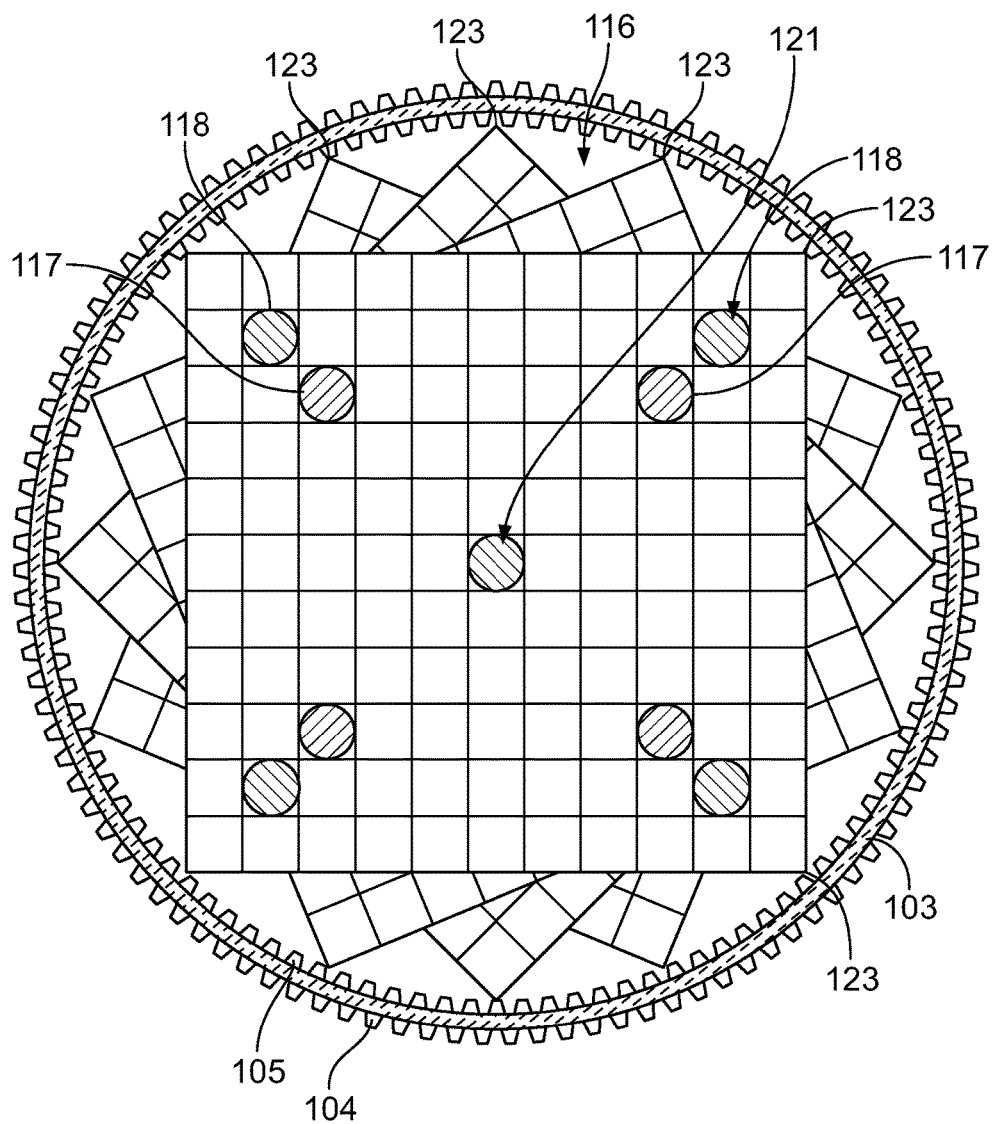
FIG. 5 is a sectional view taken along cutting plane 5-5 of FIG. 3, showing an enlarged face view of a corona reaction plate as employed in the structure of FIGS. 3 and 4.

A corona reaction plate 116 is shown in enlarged detail in FIG. 5. Each plate is nominally about 1.13 inch (2.9 cm) square and is shown with 11×11 holes defined by 12 mesh wires in each orthogonal dimension. For this size ozone generator this arrangement works. However, the ozone generator may be larger or smaller and the number and size of the openings through each reaction plate may be different. Positive support wire 121 is in the middle and spiraled supportive positive wires 117 are shown spaced from the middle toward the corners of the plate. Straight support wires 118 are also shown in FIG. 5, adjacent to the corners of plate 116. Note that in this view, partially rotated, in longitudinal stepwise fashion, are three more plates 116, corners 123 of which are shown. As constructed, each corner 123 of each plate 116 is in physical and electrical contact with inner positive mesh 105.

By way of example only, tube 103 is about 34.5 inches (87.6 cm) long and about 2.0 inches (5.1 cm) in outer diameter. The wall is about 0.06 inch (1.5 mm) thick and the tube is a crystal, preferably made of fused quartz or synthetic fused silica. Of course, the tube could be longer (for example, 36 inches) or shorter (for example, six inches), have a greater or lesser diameter (0.5 inch to 2.0 inches), and the tube wall thickness can be 1.0 mm to 2.0 mm, or thinner or thicker, all depending upon the size of the ozone generator. Suitable fused quartz crystal tubes are available from General Electric, Sylvania, and Momentive Performance Materials, for example.

Exterior jacket 112 may be made of stainless steel, fused quartz crystal, aluminum, or Pyrex glass, having an inner diameter of about 2.5 inches (6.35 cm) and a wall thickness of about 0.12 inch (3.0 mm). Jacket 112 is longer than tube 103, as shown in FIG. 3, by about 1.5 inch (3.8 cm) at each end. Jacket 112 is internally polished so the inside surface is reflective. The inner and outer mesh electrodes, 105, 104, are preferably made of stainless steel wires and could also be titanium, platinum, gold, nickel, silver, or aluminum. Various stainless steels are suitable, including low carbon SS, 304 SS, 309 SS, 310 SS, 316L SS, 321 SS, 347 SS, 400 SS, and 405 SS. The mesh wire sizes can be 8, 9, 10, 11, 13, 14, 15, 16, 17, 18, or 19, among others, with smaller wires being preferred. The wires of inside and outside meshes 105 and 104, the mesh of plates 116, as well as support wires 117, 118, and 121, are preferably 0.025 inch (0.6 mm) diameter stainless steel. Wire sizes can be between 0.015 inch and 0.028 inch, among others. A 316 SS (stainless steel), size 10, wire is preferred for corona reaction plates 116.

Referring again to FIG. 3, elongated annular chamber 113 between jacket 112 and tube 103 is an ultra-violet (UV) generating chamber having a negative charge. The tube structure within the jacket generates UV energy at a wavelength of about 185 nanometers.

As shown in FIG. 4, between each two plates 116 within tube 103 is formed an oxygen reactive allotrope chamber 124.

Power source 109 can apply a DC voltage of about six volts up to at least about 25 kilovolts, and can be supplied by any suitable DC source, including from a transformer powered from an AC source. The wattage of the power source can range from about 100 watts to about 5 kilowatts, at about 0.5 to about 1 amp. These relatively broad ranges are provided to show that the sizes of the oxygen allotrope generators constructed in accordance with this teaching can vary in scale.

It should be noted that the allotrope generator described herein is, effectively, a pressure tank. The apparatus operates at an internal back pressure of at least about 1 to at least about 25 pounds-force per square inch (psi). It has been found that greater back pressure results in higher ozone production. The back pressure is believed to force the oxygen molecules together and cause binding of oxygen molecules, thereby increasing the concentration of the ozone that is produced, and producing $O_3$ and multiple oxygen allotropes. No external pressure tank is necessary in this apparatus. For the size example discussed above (34.5 inches long and about two inches in outer diameter) the back pressure would preferably be at least about 3 psig.

As the incoming gas flows through the interior of tube 103, it encounters the rotationally offset electrically positive mesh plates 116, forcing the gas into a swirling, cyclonic effect. This applies centrifugal force to the flowing gas so that it tends to force it to encounter inner positive mesh 105, resulting in increased UV production. The gas exits generator 101 via small holes, preferably two such holes coupled to tubes 114 which are about 0.25 inch (6.35 mm) in diameter, for example, which also forces the highly excited molecules together. When combined with the back pressure the oxygen molecules have a greater chance to attract and bond, thereby creating allotropes $O_4$ and higher. The gas flows along the outside of tube 103 through chamber 113 after it passes the initial length of the tube. In the alternative embodiment of FIG. 4, as stated above, grounding wires 122 constitute a bulge or increase in diameter of the mesh enclosed tube. As the gas flows through annular chamber 113, these increased diameter grounding wire locations cause a thinning-out disbursement, turbulence, or spreading of the gas, creating further corona between outside mesh 104 and the inside surface of jacket 112.

Thus, the back pressure and the offset mesh plates force the gas to make multiple exposures or contacts with arcs, static electricity, and UV energy. While the term, "arc," is employed herein, there is only arcing through the wall of tube 103. There is no internal arcing within tube 103 or between tube 103 and jacket 112. It is believed that up to about 75% of the ozone created by the instrument herein described is accomplished inside tube 103, and the UV radiation outside tube 103 creates the remaining 25%.

Figure 6A:
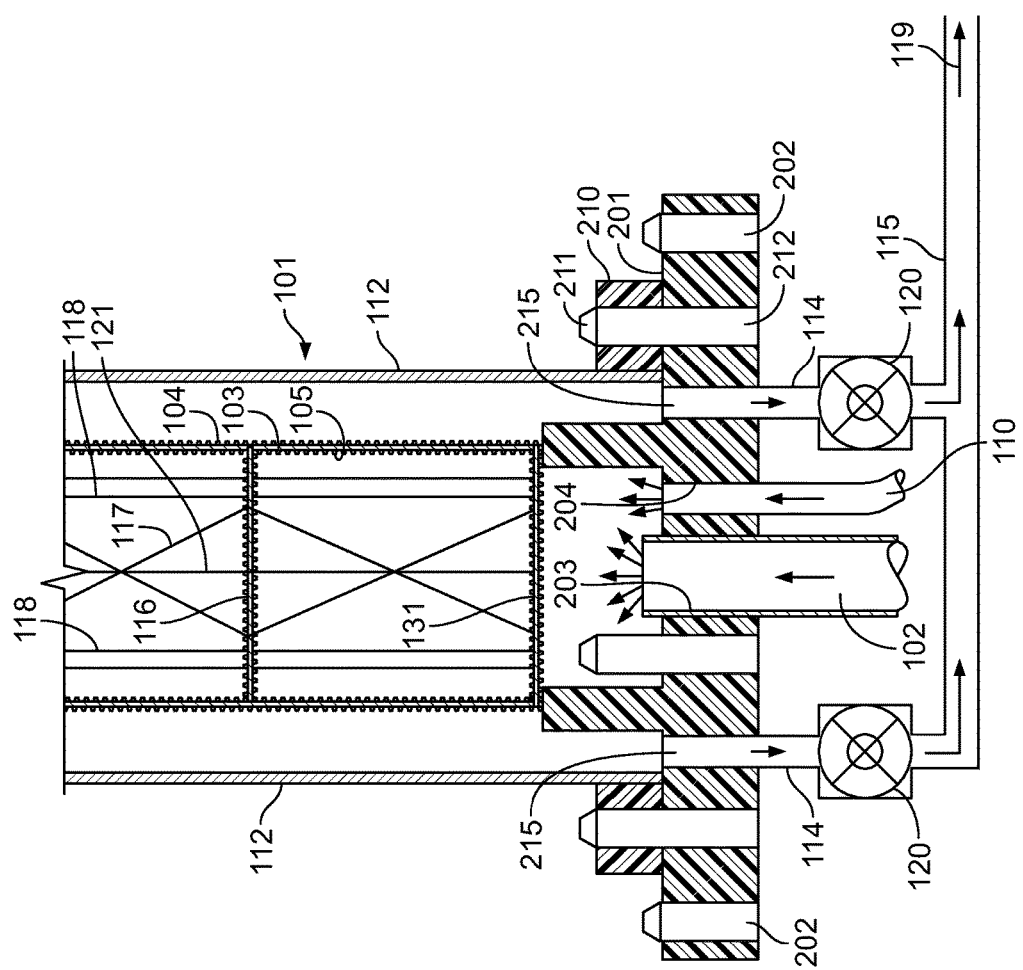
FIG. 6A is a partial sectional view of a base to which the oxygen allotrope generator of FIG. 3 is mounted.
Figure 6B:
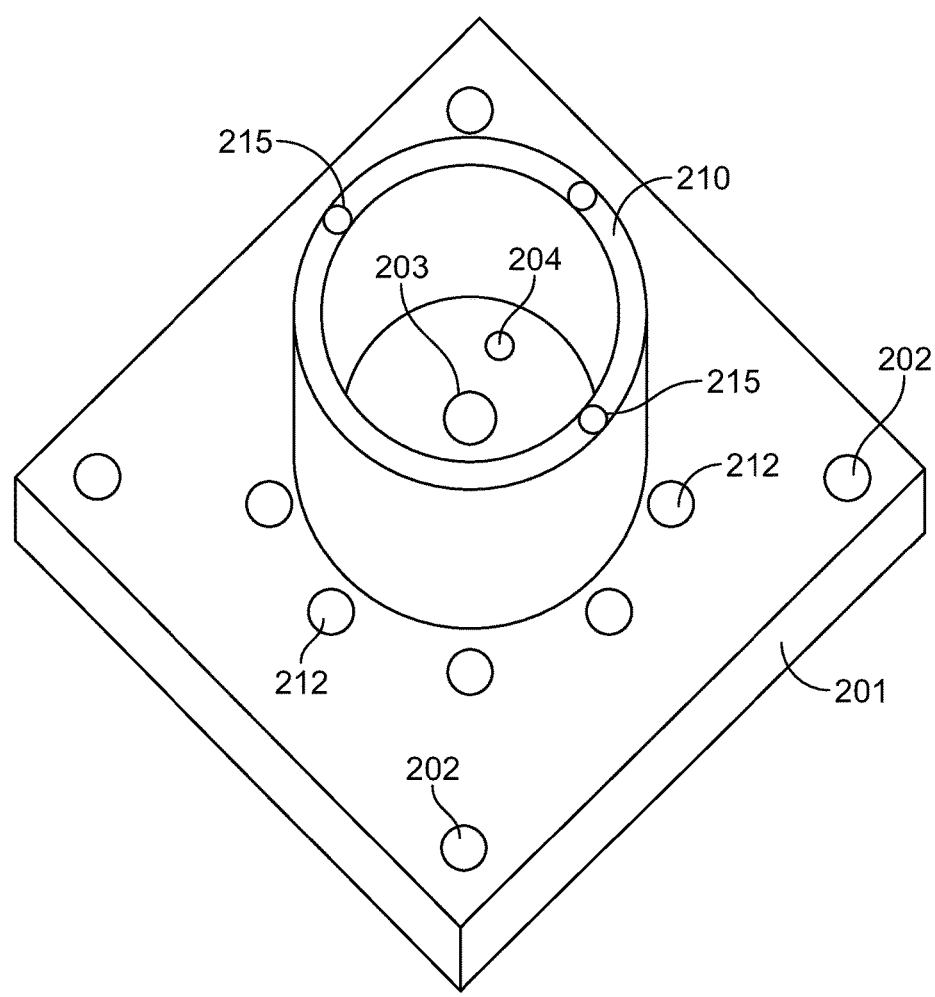
FIG. 6B is a perspective view of the base shown in FIG. 6A.

An exemplary base to which the oxygen allotrope generator of FIG. 3 can be mounted is shown in FIGS. 6A and 6B. The right hand end of the apparatus of FIG. 3 is shown mounted to base 201 in a typically vertical operating orientation. The base is adapted to be mounted at the operational location with bolts, as appropriate, through holes 202. In the middle of the base is hole 203 through which passes tube 102 supplying oxygen to the interior of tube 103. Electrically positive connecting wire 110 is shown passing through hole 204 and is connected to support wires 117, 118, and 121, and inside mesh 105.

Flange 210 is secured to the end of generator 101 and is mounted to base 201 by suitable means such as bolts 211 through holes 212. Holes 215 are connected to allotrope exit tubes 114.

It is anticipated that both base 201 and flange 210 would be formed of CPVC (chlorinated polyvinyl chloride) but other materials having similar appropriate properties could be used.

Figure 7:
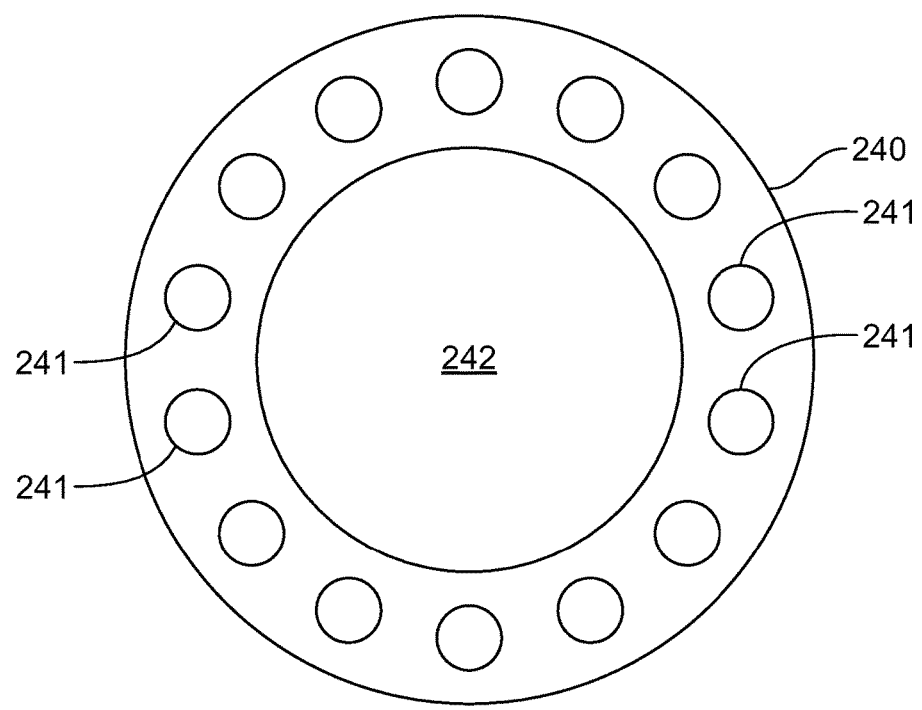
FIG. 7 is a plan view of the support ring employed at the top end of the generator of FIG. 3.

Support ring 240 is shown in FIG. 7. This ring fits on the end of tube 103 opposite to the end mounted to base 201, as seen in FIG. 3. Holes 241 provide for flow of partially ozonized gas 111 from inside tube 103 to chamber 113 between the tube and jacket 112. Center opening 242 accommodates gas flow out from the left hand end of tube 103, as shown in FIG. 3. Support ring 240 is preferably made of PTFE or equivalent.

With respect to the effectively reduced heat feature of this apparatus, in contrast with the closed-ends configurations of the prior art, as discussed above, the present system is not closed at the top (left end in FIG. 3). Support ring 240 supports the top end of tube 103 within jacket 112 with free flow out the end of the tube and down the outside of tube 103 through chamber 113.

Support ring 240 thus serves two purposes: it supports the top end of tube 103; and it evenly distributes the oxygen allotrope gas around that end and directs it down to the exit holes in base 201.

This structure results in an effective self-cooling of the oxygen allotrope generator.

Some Advantages of the Disclosed Embodiments with Respect to the Prior Art

Within each separated chamber 124 (that portion within tube 103 and between two adjacent mesh plates 116 in FIG. 4) there are a number of simultaneous actions reacting with the oxygen molecules: 1) radiation (UV); 2) electrical charge (arc) at the wall of tube 103; 3) static charge (offset mesh plates, and offset mesh plate wires); and 4) elevated pressure. As the oxygen enters tube 103 it is immediately introduced to UV radiation, light radiation/arc, direct electrical/static, and non-direct electrical type of environment. The oxygen molecules are immediately affected by the UV (radiation), then contact is made with the arcing effect (corona), then the oxygen is forced through the offset mesh plates (static). The positive electric corona (arc) effect takes place when the positive charge seeks ground through the tube wall. This positive charge (wall arcing) produces a UV light effect (via the positive charge grounding through the fused quartz crystal tube wall) and a static positive charge on each offset plate 116 (each square offset mesh plate is 11 holes square in this exemplary embodiment). There is also static electricity on the wires (117, 118, 121) supporting the offset mesh plates.

It is estimated that there is a 30% to 35% ozone (multiple allotropes) conversion that takes place via the offset mesh plates. As for oxygen allotropes, tri-atomic $O_3$ is an unstable triangular structural combination of (−O, +O, −O), that is, one positively charged oxygen molecule and two negatively charged oxygen molecules, creating six half bonds and three full bonds. Though this has a higher energy level, because the oxygen is trying to reform into its original two half-bond structure it is exceptionally/indiscriminately reactive and acts as a little time bomb with the first foreign molecule it reacts with (hence needing a far greater amount of ozone to treat a water source). A multiple tetra-oxygen $O_4$ allotrope bond also takes place when oxygen molecules are subject to appropriate pressure. This might look like this: (−O, +O, −O, +O). The tetra-oxygen will have a tetrahedral bond, with eight half bonds, or four full bonds, creating a much more stable form of oxygen with a higher potential energy.

In relation to the UV light effect, a positively charged wire 110 is connected to an electrically conductive mesh-like material (inner mesh 105) (FIGS. 3 and 6A) which is in contact against the full length of the inner tube wall (the inner mesh is "tightly" molded around and against the inner surface of the tube) and a similar electrical "grounding wire" (negative) 108 is connected to electrically conductive mesh-like material which, too, is in contact with (again, the outer mesh 104 is "tightly" molded to the tube surface) the outer surface of the tube wall. By "molded" it is meant that the mesh is closely fitted on the tube surfaces. When electricity at an appropriate voltage (for example, 15 KV) from power source 109 is applied an arcing will take place between meshes 104, 105 through the fused quartz crystal wall. This arcing creates a UV effect that can be increased or decreased by the level of voltage being used. The UV radiation effect (violet/pink in color) can be seen when the generator is activated in a dark room. The UV can be controlled like a dimmer on a light switch by controlling the amount of electricity being applied. It has been determined that fused quartz crystal is excellent for the transference of the ultraviolet spectrum, but it is not the only material that can function adequately.

It should be noted that this generator does not produce a corona effect within tube 103. Further, with this generator there is no arcing within the fused quartz crystal tube; arcing occurs only through the tube wall. It has been observed that known other corona type generators are designed to create a corona reaction within its tube or inner circumference. For example, in such prior art devices, one inner wall arcs to the opposite inner wall, or the inner wall arcs to a metal rod located down the middle of the round tube or ring-like generator. As used herein, the term "corona effect" is used interchangeably with "arcing effects" and is intended to mean the same thing.

There are at least three different operational aspects of this system which produce ozone. One is ultraviolet light (UV), which can be produced by a light at about 140-250 nm wavelength radiation. A UV light effect in the stated wavelength range of a positive electrical charge is produced within fused quartz crystal tube 103 without the presence of mercury gas, which gas is typically employed in UV bulbs. This UV wavelength radiation results from a positive electrical wire 110 connected to inner wire mesh 105 within tube 103 which arcs through the wall of the tube to outer grounding mesh 104.

As the gas, with some ozone already created due to the positive UV radiation within tube 103, passes in the opposite direction outside tube 103 through annular chamber 113, there is a second exposure to UV radiation, this time at a negative charge. Thus, the oxygen molecules are doubly exposed to UV radiation, resulting in increased oxygen allotrope production, further adding or stripping the oxygen molecules that were previously converted to $O_3$, and possibly $O_4$, or other allotropes, within the internal portion of the oxygen allotrope generator. A negative ion is an oxygen atom with an extra electron, it is odorless. A positive ion is an oxygen atom with one less electron. Through the following UV, corona, and static process, oxygen molecules will add or lose electrons.

By way of further explanation, UV has a stripping effect on the oxygen molecules, that is, it strips an electron from an oxygen molecule, causing it to convert from a stable molecule, $O_2$, to a nascent oxygen molecule, $O_1$, thereby potentially producing an $O_3$ molecule. $O_1$ is a hyperactive species, unstable and short lived. For this reason it has to be generated in situ where and when it is needed.

A second ozone producer is a corona charge. Here, oxygen is passed through the center of a ring-like diode where it is passed (arced) from the inside, or positive, mesh to the outside, or ground, mesh. The corona effect has a charging effect on the oxygen molecules.

The third ozone producer in operation here is the static electrical charge. This is the same phenomenon as the common effect which results from shoes on a carpet of certain materials, or rubbing a balloon surface. The static electrical charge further magnetizes the oxygen molecules. $O_2$ is, by nature, a magnetic molecule.

This apparatus is scalable and can produce ozone at a minimum rate of about 0.5 to at least about 1,050 g/Nm$^3$ (gas phase grams of ozone per normal cubic meter) of instant ozone. The conversion of oxygen molecules to $O_3$ (ozone) and additional oxygen allotrope clusters, even possibly including solid oxygen, increases by as much as tenfold with every encounter of the incoming gas with each offset mesh plate 116. It is believed that in addition to $O_3$, other oxygen allotropes, including $O_4$, $O_6$, and stable oxygen $O_8$ are being produced by the process of this system. It may also produce a constant flow of $O_8$ (solid oxygen), and possibly $O_9$ (metal oxygen). The more $O_3$ and allotropes that are created, the greater the disinfecting value of the output of this system.

The oxygen allotropes resulting from the factors set out above are enhanced in volume or number by the increased pressure previously described.

Based on the expectation that multiple oxygen allotropes are being created other than just $O_3$, for every mesh plate chamber that the oxygen-laden gas passes through, there is a multiplication of oxygen allotropes that are being created. Tests have shown that $O_3$ allotropes are the most obvious at the outset. When the proper back pressure is applied and the proper contact time is allowed between the fused quartz chamber meshes 104, 105 (corona arc), mesh offset plates 116 (static), and UV exposure (nanometer wavelength radiation), the $O_3$ allotropes alone increase from about 3 grams to as much as 30 grams. When ten mesh plates are applied, the generator reaches a level of 300 grams of $O_3$ g/Nm$^3$ (the amount of ozone estimated in an approximate three feet by three feet (0.91×0.91 meter) square area. Further, with this apparatus more ozone output can be achieved than would ordinarily be expected in relation to the size of the generator, electrical input, oxygen gas amount, and oxygen temperature. For some purposes a proportionately smaller ozone generator might be appropriate. Conversely, larger generators are contemplated.

There are many potential markets in which, and purposes for which, this apparatus can be used, such as fluids decontamination and enhancer for water, even including ocean water, storm water, waste waters, gases, chemicals, and many others.

An additional benefit of this apparatus is that, considering its size and required applied power, it produces more stable ozone molecules than similar size prior art devices, thereby resulting in the potential to decrease, if not eliminate, the production of possible negative by-products and providing a more stable decontamination effect.

What is claimed is:

1. An oxygen allotrope generator comprising:
a tube having a wall of a predetermined thickness, said tube wall having an inner surface and an outer surface and having a first end and a second end;
an inlet connected to said first end of said tube end and adapted to be coupled to a source of oxygen-containing gas;
a first electrically conductive element on the outer surface of said tube, said first element being adapted to be connected to ground;

a second electrically conductive element on the inner surface of said tube;

a conductor for connecting said second electrically conductive element to a source of electrical power;

a tubular jacket surrounding said tube and being spaced from said tube wall by a predetermined distance, said tubular jacket having a closed end spaced from said second end of said tube, thereby providing a path for flow of gas out of said second end of said tube and back down said outer surface of said tube within said tubular jacket;

an outlet for oxygen allotrope-containing gas to exit from said jacket; and a plurality of spaced corona reaction plates across the interior of said tube, said corona reaction plates being electrically conductive and being electrically connected to said second electrically conductive element.

2. The oxygen allotrope generator claim 1, and further comprising a longitudinal central support wire interconnecting said corona reaction plates.

3. The oxygen allotrope generator of claim 1, and further comprising a plurality of corona reaction wires interconnecting said corona reaction plates.

4. The oxygen allotrope generator of claim 1, and further comprising a plurality of support wires interconnecting said corona reaction plates.

5. The oxygen allotrope generator of claim 1, wherein adjacent said corona reaction plates are rotationally offset with respect to each other.

6. The oxygen allotrope generator of claim 4, wherein adjacent said corona reaction plates are rotationally offset with respect to each other.

7. The oxygen allotrope generator of claim 4, wherein said support wires are spirally arranged through said plurality of corona reaction plates.

8. The oxygen allotrope generator of claim 6, wherein said support wires are spirally arranged through said plurality of corona reaction plates.

9. The oxygen allotrope generator of claim 1, and further comprising a ground connector external to said tube at the location of each corona reaction plate location within said tube.

10. The oxygen allotrope generator of claim 9, wherein said ground connectors each comprise a wire wrapped around said tube outside of said first electrically conductive element.

11. The oxygen allotrope generator of claim 1, wherein one corona reaction plate of said plurality of corona reaction plates is connected across each end of said tube and the remainder of said plurality of corona reaction plates are generally equally spaced along the length of said tube between said corona reaction plates at each end of said tube.

12. The oxygen allotrope generator of claim 1, each said corona reaction plate is comprised of a mesh of electrically conductive wires.

13. The oxygen allotrope generator of claim 1, and further comprising a support ring at the end of said tube opposite to the inlet end, said support ring supporting the end of said tube within said jacket, said support ring having an opening therethrough for partially ozonated gas to exit said tube and distributive holes around the periphery thereof for the partially ozonated gas to pass along the outside of said tube inside said jacket.

14. The oxygen allotrope generator of claim 1, and further comprising a base for mounting to the oxygen allotrope generator.

15. The oxygen allotrope generator of claim 1, wherein said first electrically conductive element is a wire mesh that generally surrounds the outer surface of said tube.

16. The oxygen allotrope generator of claim 1, wherein said second electrically conductive element is a wire mesh that generally covers the inner surface of said tube.

17. The oxygen allotrope generator of claim 15, wherein said second electrically conductive element is a wire mesh that generally covers the inner surface of said tube.

18. The oxygen allotrope generator of claim 1, wherein the apparatus as structured operates above atmospheric internal pressure.

19. The oxygen allotrope generator of claim 18, wherein the pressure within the apparatus is from about 1.0 psi to about 25 psi.

20. An oxygen allotrope generator comprising:

a tube having a wall of a predetermined thickness, said tube wall having an inner surface and an outer surface and having a first end and a second end;

an inlet connected to said first end of said tube end and adapted to be coupled to a source of oxygen-containing gas;

a first electrically conductive element on the outer surface of said tube, said first element being adapted to be connected to ground;

a second electrically conductive element on the inner surface of said tube;

a conductor for connecting said second electrically conductive element to a source of electrical power;

a tubular jacket surrounding said tube being spaced from said tube wall by a predetermined distance and having a closed end spaced from said second end of said tube, thereby providing a path for flow of gas out of said second end of said tube and back down said outer surface of said tube within said tubular jacket;

an outlet for oxygen allotrope-containing gas to exit from said jacket;

a plurality of spaced corona reaction plates across the interior of said tube, said corona reaction plates being electrically conductive and being electrically connected to said second electronically conductive element;

a longitudinal central support wire interconnecting said corona reaction plates a plurality of corona reaction wires interconnecting said corona reaction plates; and a plurality of support wires interconnecting said corona reaction plates.

* * * * *